US012439231B2

(12) United States Patent
Wright et al.

(10) Patent No.: US 12,439,231 B2
(45) Date of Patent: Oct. 7, 2025

(54) INTELLIGENT VEHICLES AND CONTROL LOGIC FOR ENHANCED VEHICLE-TO-EVERYTHING WIRELESS MESH COMMUNICATIONS

(71) Applicant: GM GLOBAL TECHNOLOGY OPERATIONS LLC, Detroit, MI (US)

(72) Inventors: Adam L. Wright, Livonia, MI (US); Scott T. Droste, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 413 days.

(21) Appl. No.: 18/187,194

(22) Filed: Mar. 21, 2023

(65) Prior Publication Data
US 2024/0323660 A1   Sep. 26, 2024

(51) Int. Cl.
H04W 4/40 (2018.01)
H04L 45/122 (2022.01)
H04W 84/18 (2009.01)

(52) U.S. Cl.
CPC ............. *H04W 4/40* (2018.02); *H04L 45/122* (2013.01); *H04W 84/18* (2013.01)

(58) Field of Classification Search
CPC ......... H04W 4/40; H04W 4/46; H04W 84/18; H04L 45/122
See application file for complete search history.

(56) References Cited

U.S. PATENT DOCUMENTS

| | | |
|---|---|---|
| 5,842,130 A | 11/1998 | Oprescu-Surcobe et al. |
| 7,627,307 B2 | 12/2009 | Droste |
| 8,995,947 B2 | 3/2015 | Droste |
| 9,578,580 B1 | 2/2017 | Ishfaq et al. |
| 9,705,992 B2 | 7/2017 | Droste et al. |
| 9,716,758 B2 | 7/2017 | Droste |
| 10,382,256 B2 | 8/2019 | Cawse et al. |
| 10,862,558 B1 | 12/2020 | Aminikashani et al. |
| 2015/0172919 A1 | 6/2015 | Basnayake et al. |
| 2016/0309527 A1 | 10/2016 | Chen |
| 2017/0018182 A1* | 1/2017 | Makled .................. G08G 1/087 |

(Continued)

Primary Examiner — Asad M Nawaz
Assistant Examiner — Michael Wayne Maddox
(74) Attorney, Agent, or Firm — Quinn IP Law

(57) ABSTRACT

Presented are intelligent vehicle communications (comm) systems provisioning enhanced vehicle-to-everything (V2X) wireless mesh network (WMN) hop propagation, methods for making/using such systems, and vehicles equipped with such systems. A method of controlling operation of a host vehicle includes a vehicle controller determining the host vehicle is incapacitated and then detecting the host vehicle's wireless comm device is unable to connect to a cellular or satellite communications system. Responsive to such insufficient connectivity, the controller broadcasts a V2X WMN distress message containing data specific to the host vehicle and data specific to the host vehicle's incapacitating event. Upon receipt of the distress message, a recipient vehicle's controller determines if a prior distress message for the incapacitating vehicle event was previously received and if the distress message exceeds any preset multi-hop restrictions. If yes to either, the resident controller disables retransmission of the distress message to other recipient nodes over the WMN.

20 Claims, 3 Drawing Sheets

(56) References Cited

U.S. PATENT DOCUMENTS

| | | | |
|---|---|---|---|
| 2017/0243485 A1* | 8/2017 | Rubin | H04W 4/46 |
| 2018/0063882 A1 | 3/2018 | MacDonald | |
| 2020/0374766 A1 | 11/2020 | Veloso | |
| 2021/0122312 A1 | 4/2021 | Aminikashani et al. | |
| 2021/0153154 A1 | 5/2021 | Droste et al. | |
| 2021/0345220 A1* | 11/2021 | Bensator | H04L 12/4633 |
| 2022/0377513 A1* | 11/2022 | Elgee | H04W 4/46 |
| 2023/0156837 A1* | 5/2023 | Hwang | H04W 84/04 |
| | | | 370/329 |

* cited by examiner

INTELLIGENT VEHICLES AND CONTROL LOGIC FOR ENHANCED VEHICLE-TO-EVERYTHING WIRELESS MESH COMMUNICATIONS

INTRODUCTION

The present disclosure relates generally to wireless communication systems for motor vehicles. More specifically, aspects of this disclosure relate to systems, methods, and devices for provisioning V2X wireless mesh communication for disabled vehicles.

Current production motor vehicles, such as the modern-day automobile, may be equipped with a network of onboard electronic controllers and wireless communications devices that provide automated driving capabilities, navigation assistance, and other vehicle services. As vehicle processing, communication, and sensing capabilities improve, manufacturers persist in offering more automated driving capabilities with the aspiration of producing fully autonomous "self-driving" vehicles competent to navigate among heterogeneous vehicle types in both urban and rural scenarios. Original equipment manufacturers are moving towards vehicle-to-vehicle (V2V) and vehicle-to-everything (V2X) "talking" cars with higher-level driving automation that employ autonomous control systems to enable vehicle routing with steering, lane changing, scenario planning, etc. Automated path planning systems, for example, utilize vehicle state and dynamics sensors, geolocation information, map and road condition data, and path prediction algorithms to provide route derivation with automated lane center and lane change forecasting.

To provide occupants with telecommunications and informatics functionality, many vehicle passenger compartments are now furnished with a center-stack telematics unit that enables the sending, receiving, and storing of information using wireless connectivity. The telematics unit may wirelessly connect to a cellular network for such purposes as real-time navigation, customer support, vehicle tracking, system monitoring, traffic data, and fleet management. In general, the telematics unit functions as a bidirectional radio transceiver that is able to simultaneously transmit and receive data in the form of network data packets. Data packets may be transmitted via UHF, SHF and/or EHF radio signal from a cell tower to a cellular-enabled vehicle via downlink (or download) transmission and, conversely, may be transmitted via uplink (or upload) transmission from the vehicle to a cell tower. Uplink or downlink signal disturbances in a cellular network may cause weak or intermittent signals that lead to disruptions in a vehicle's wireless communication functionality.

SUMMARY

Presented herein are intelligent vehicle communications (comm) systems with attendant control logic for provisioning enhanced V2X wireless mesh network (WMN) hop propagation, methods for making and methods for operating such vehicle comm systems, and vehicles equipped with such comm systems. By way of example, an in-vehicle smart comm system executes memory-stored control logic that enhances wireless eCall V2X mesh communications to extend vehicle contact range, e.g., in areas with little or no cellular coverage. To militate against viral multi-hop propagation, the vehicle comm system implements a "stop-call" protocol that incorporates vehicle-and-event specific (Unique ID) data and vehicle-and-event calibratable WMN hop restrictions that both limit the number of node-to-node message retransmissions. When unable to establish a direct cellular connection with a centralized back-office (BO) vehicle services system, a disabled host vehicle may generate and broadcast across an ad-hoc mesh network a distress message (eCall) with a unique reference number, real-time vehicle geolocation data, event specifics and severity data, vehicle-specific data (make/model/trim/color), etc. Receiving WMN-connected devices use this Unique ID data to determine whether or not a prior V2X message was already received and, if not, whether or not the new V2X message exceeds predefined, calibratable multi-hop restrictions: (1) a timer threshold, (2) a geofence threshold, and (3) a maximum hop count threshold. If the message exceeds any threshold, a stop call flag is set and the receiving device is prevented from retransmitting the message.

Attendant benefits for at least some of the disclosed concepts include enhanced V2X WMN comm protocols that prevent viral message propagation by implementing an acknowledge-return transmission that incorporates vehicle-specific Unique ID data, geofence constraints, a timestamp, and a message-independent hop counter. Doing so helps to improve V2X mesh communications by avoiding redundant vehicle bus usage with a concomitant reduction in processing load. Minimizing redundant messaging also helps to prevent overload to the carrier network and the call center servers. In addition to constraining message retransmission, each WMN transmission may automate a return message to the originating host vehicle indicating that an ad-hoc network has been established and a BO service was successfully contacted (e.g., "Help is on the way!"). Calibratable hop restrictions also help to dynamically tailor system response to individual event and vehicle needs.

Aspects of this disclosure are directed to intelligent vehicle communications systems, system control logic, and memory-stored instructions for managing V2X WMN messaging. In an example, a method is presented for controlling operation of a host vehicle with a resident or remote controller or module or network of controllers/modules (collectively "controller" or "vehicle controller") and one or more wireless comm devices (e.g., a dedicated short-range communications (DSRC) device and a high-frequency radio transceiver). This representative method includes, in any order and in any combination with any of the above and below disclosed options and features: receiving, e.g., via the vehicle controller from an occupant interface or vehicle interface module, a vehicle disabled signal indicating the host vehicle is incapacitated due to an incapacitating vehicle event (e.g., powertrain fault or collision event); detecting, e.g., via the vehicle controller responsive to receiving the vehicle disabled signal, insufficient connectivity rendering the host vehicle's wireless comm device unable to wirelessly connect to a cellular or satellite communications system; broadcasting, e.g., over a WMN via the host vehicle's controller responsive to detecting insufficient connectivity, a distress message containing data specific to the host vehicle and data specific to the incapacitating vehicle event; determining, e.g., via a resident controller of a WMN-connected recipient vehicle using the vehicle data, if a prior distress message for the incapacitating vehicle event was previously received (e.g., crosscheck Unique ID code against cache-memory stored codes); determining, e.g., via the recipient vehicle's resident controller using the incident data, if the distress message exceeds a preset multi-hop restriction (e.g., calling up event-calibrated messaging thresholds); and disabling, e.g., via the resident controller responsive to either the prior distress message being received or the distress message exceeding a predefined multi-hop restriction, retransmission of the distress message from the recipient vehicle to another recipient node over the WMN.

Aspects of this disclosure are also directed to computer-readable media (CRM) for managing V2X WMN messaging across a network of talking vehicles. In an example, non-transitory CRM store instructions executable by a host vehicle's controller and a recipient vehicle's controller. When executed, these instructions cause the controllers to perform operations, including: receiving, via the host vehicle's controller, a vehicle disabled signal indicating the host vehicle is incapacitated due to an incapacitating event; detecting, via the host vehicle's controller responsive to receiving the vehicle disabled signal, an insufficient connectivity state indicating a wireless comm device of the host vehicle is unable to wirelessly connect to a cellular or satellite communications system; broadcasting, via the host vehicle's controller over a wireless mesh network responsive to detecting the insufficient connectivity state, a distress message containing vehicle data specific to the host vehicle and incident data specific to the incapacitating event; receiving, via the recipient vehicle's controller using a wireless comm device of the recipient vehicle, the distress message over the WMN; determining, via the recipient vehicle's controller using the vehicle data, if a prior distress message for the incapacitating vehicle event was previously received; determining, via the recipient vehicle's controller using the incident data, if the distress message exceeds a preset multi-hop restriction; and transmitting, via the recipient vehicle's controller responsive to either the prior distress message being previously received or the distress message exceeding the predefined multi-hop restriction, a disable command signal to a resident subsystem of the recipient vehicle disabling retransmission of the distress message to another recipient node over the WMN.

Additional aspects of this disclosure are directed to motor vehicles with intelligent vehicle comm systems provisioning enhanced V2X WMN messaging capabilities. As used herein, the terms "vehicle" and "motor vehicle" may be used interchangeably and synonymously to include any relevant vehicle platform, such as passenger vehicles (ICE, HEV, FEV, fuel cell, etc.), commercial vehicles, industrial vehicles, tracked vehicles, all-terrain vehicles, motorcycles, farm equipment, watercraft, aircraft, e-bikes, etc. In an example, a distributed network of wirelessly communicating motor vehicles (vehicle network) includes one or more host vehicles and one or more recipient vehicles. Each host vehicle contains a vehicle controller and a wireless communications device. The host vehicle's controller is programmed to receive one or more signals indicating the host vehicle is incapacitated due to an incapacitating vehicle event and, after receiving the disabled vehicle signal(s), detect insufficient connectivity that renders the host vehicle's wireless comm device unable to wirelessly connect to a cellular or satellite communications system. Upon detecting insufficient connectivity, the host vehicle's controller broadcasts a distress message over a wireless mesh network; the message contains unique vehicle data specific to the host vehicle and incident data specific to the event that disabled the host vehicle.

Continuing with the preceding discussion, each WMN-connected recipient vehicle contains a resident controller and a resident wireless comm device that exchanges data across the WMN. The recipient vehicle's resident controller is programmed to receive the host vehicle's distress message via the resident wireless comm device and, using the vehicle-specific data embedded in the distress message, determine if a prior distress message for the incapacitating vehicle event was previously received by the recipient vehicle. The resident controller also uses the incident-specific data embedded in the distress message to determine if the distress message exceeds a preset multi-hop restriction. Responsive to the prior distress message being received and/or the distress message exceeding a predefined multi-hop restriction, the recipient vehicle's resident controller disables retransmission of the distress message to another recipient node over the WMN.

For any of the disclosed vehicles, methods, and CRM, the distress message may contain a hop counter that tracks a number of times the received distress message was transmitted from node to node on the WMN. In this instance, the preset multi-hop restriction may include a predefined hop count threshold; the distress message may be said to exceed the preset multi-hop restriction when the hop counter exceeds the hop count threshold. As another option, the distress message may contain a hop timer that tracks a time since the distress message was first broadcast by the host vehicle over the WMN. In this instance, the preset multi-hop restriction may include a predefined hop time threshold; the distress message may be said to exceed the preset multi-hop restriction when the hop timer exceeds the hop time threshold. In another example, the distress message may contain a real-time location of the host vehicle. In this instance, the preset multi-hop restriction may include a geofence boundary that is defined relative to the host vehicle's real-time location; the distress message may be said to exceed the multi-hop restriction when a real-time location of the recipient vehicle is outside the geofence boundary.

For any of the disclosed vehicles, methods, and CRM, a recipient vehicle's controller-after receiving the distress message—may then receive a hop interrupt message indicating that the host vehicle's distress message was successfully transmitted via another node on the WMN to a back-office vehicle services system or a first responder entity. Upon receiving the hop interrupt message, the recipient vehicle's resident controller responsively disables retransmission of the distress message by the recipient vehicle to another node over the WMN. As another option, the host vehicle's controller, after receiving the disabled vehicle signal, may detect sufficient connectivity to enable the host vehicle's wireless comm device to wirelessly connect to the cellular/satellite comm system. Upon detecting sufficient connectivity, the host vehicle controller may disable broadcast or retransmission of the distress message via the host over the WMN. As another option, the recipient vehicle's controller may also access a resident or remote memory device, which stores an assortment of multi-hop restrictions, to retrieve a set of multi-hop restrictions calibrated to a severity level of the incapacitating vehicle event. In this instance, the recipient vehicle's controller may set the preset multi-hop restriction to the set of event-calibrated multi-hop restrictions.

For any of the disclosed vehicles, methods, and CRM, the recipient vehicle's controller may respond to the prior distress message not being received and the distress message not exceeding the predefined multi-hop restriction by retransmitting the distress message to one or more additional nodes over the WMN. The recipient vehicle's controller may first detect insufficient connectivity that renders the recipient vehicle's wireless comm device unable to contact the BO vehicle services system or first responder entity. In this instance, the distress message is retransmitted to one or more additional nodes over the WMN further in response to detecting the insufficient connectivity. As another option, the recipient vehicle's controller may respond to detecting the insufficient connectivity status by retrying to contact the BO/first responder and thereafter detecting a failed retry connection event indicating that the recipient vehicle did not successfully contact the BO vehicle services system or first responder entity. In this instance, the recipient vehicle's controller responds to the failed retry connection event by determining if a retry connection counter tracking a number of retry connection attempts exceeds a retry count threshold. The distress message may be retransmitted to one or more nodes over the WMN further in response to the retry connection counter exceeding the retry count threshold. The recipient vehicle's controller may increment a hop counter contained in the distress message prior to retransmitting the distress message over the WMN.

For any of the disclosed vehicles, methods, and CRM, the recipient vehicle's controller may respond to the prior distress message not being received and the distress message not exceeding the predefined multi-hop restriction by detecting sufficient connectivity that enables the recipient vehicle's controller and wireless comm device to contact the BO vehicle services system or first responder entity. In this instance, the recipient vehicle's controller may respond to detecting sufficient connectivity by: (1) transmitting the distress message to the BO vehicle services system or first responder entity; (2) transmitting a return message to the host vehicle indicating the distress message was sent to the BO system or first responder; and (3) broadcasting a hop interrupt message to one or more additional nodes over the WMN indicating the distress message was sent to the BO system/first responder. As another option, the vehicle disabled signal may be received by the host vehicle's controller from a vehicle interface micro control unit (MCU) resident to the host vehicle or an occupant of the host vehicle via an in-vehicle human machine interface (HMI) or other suitable user input device.

The above summary does not represent every embodiment or every aspect of the present disclosure. Rather, the foregoing summary merely provides a synopsis of some of the novel concepts and features set forth herein. The above features and advantages, and other features and attendant advantages of this disclosure, will be readily apparent from the following Detailed Description of illustrated examples and representative modes for carrying out the disclosure when taken in connection with the accompanying drawings and appended claims. Moreover, this disclosure expressly includes any and all combinations and subcombinations of the elements and features presented above and below.

Figure 1:
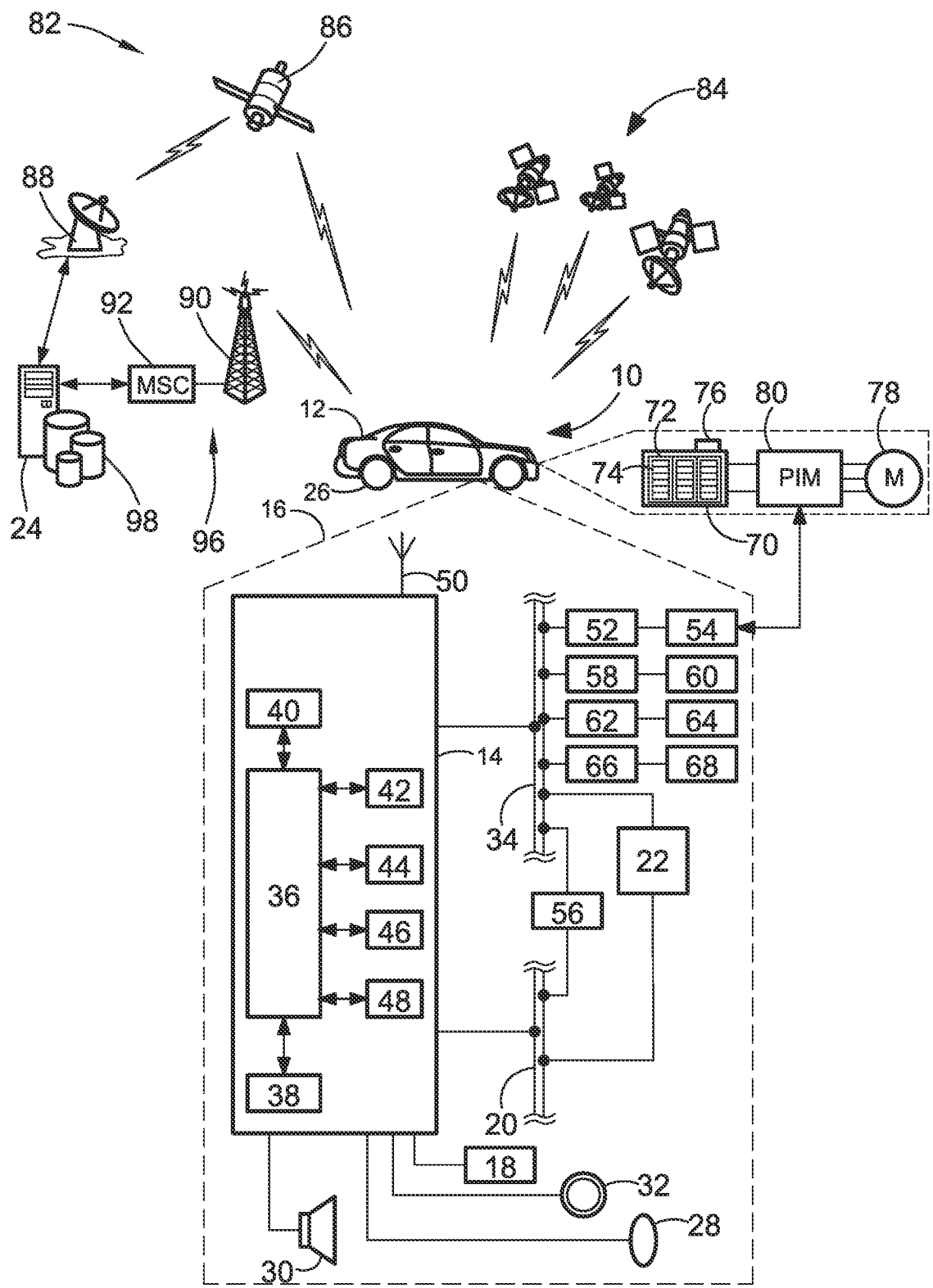
FIG. 1 is a partially schematic, side-view illustration of a representative motor vehicle with a network of in-vehicle controllers, sensing devices, and communication devices for provisioning enhanced V2X wireless mesh communications in accord with aspects of the present disclosure.

The present disclosure is amenable to various modifications and alternative forms, and some representative embodiments of the disclosure are shown by way of example in the drawings and will be described in detail herein. It should be understood, however, that the novel aspects of this disclosure are not limited to the particular forms illustrated in the above-enumerated drawings. Rather, this disclosure covers all modifications, equivalents, combinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise. Moreover, recitation of "first", "second", "third", etc., in the specification or claims is not used to establish a serial or numerical limitation; rather, these designations may be used for ease of reference to similar features in the specification and drawings and to demarcate between similar elements in the claims.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a horizontal driving surface.

Referring now to the drawings, wherein like reference numbers refer to like features throughout the several views, there is shown in FIG. 1 a representative motor vehicle, which is designated generally at 10 and portrayed herein for purposes of discussion as a sedan-style, electric-drive automobile. The illustrated automobile 10—also referred to herein as "motor vehicle" or "vehicle" for short—is merely an exemplary application with which novel aspects of this disclosure may be practiced. In the same vein, incorporation of the present concepts into the illustrated wireless communications network for cellular and mesh-enabled "talking" cars should also be appreciated as a non-limiting implementation of disclosed features. As such, it will be understood that novel aspects and features of this disclosure may be applied to other wireless network architectures, implemented for any applicable type of V2X communication exchange (e.g., V2V, V2I, V2P, V2D, etc.), and may be incorporated into any logically relevant type of vehicle. Moreover, only select components of the motor vehicles and wireless communications systems are shown and described in additional detail herein. Nevertheless, the vehicles and systems discussed below may include numerous additional and alternative features, and other available peripheral components, for carrying out the various methods and functions of this disclosure.

The representative vehicle 10 of FIG. 1 is originally equipped with a vehicle telecommunications and information ("telematics") unit 14 that wirelessly communicates, e.g., via cell towers, base stations, mobile switching centers, satellite service, etc., with a remotely located back-office (BO) cloud computing host service 24 (e.g., ONSTAR®). Some of the other vehicle hardware components 16 shown generally in FIG. 1 include, as non-limiting examples, an electronic video display device 18, a microphone 28, audio speakers 30, and assorted user input controls 32 (e.g., buttons, knobs, switches, touchpads, joysticks, touchscreens, etc.). These hardware components 16 function, in part, as a human-machine interface (HMI) that enables a user to communicate with the telematics unit 14 and other components resident to and remote from the vehicle 10. Microphone 28, for instance, provides occupants with a means to input verbal or other auditory commands; the vehicle 10 employs an embedded voice-processing unit utilizing audio filtering, editing, and analysis modules to convert the inputs to signals. Conversely, the speakers 30 provide audible output to a vehicle occupant and may be either a stand-alone speaker dedicated for use with the telematics unit 14 or may be part of an audio system 22. The audio system 22 is operatively connected to a network connection interface 34 and an audio bus 20 to receive analog information, rendering it as sound, via one or more speaker components.

Communicatively coupled to the telematics unit 14 is a network connection interface 34, suitable examples of which include twisted pair/fiber optic Ethernet switches, parallel/serial communications buses, local area network (LAN) interfaces, controller area network (CAN) interfaces, and the like. The network connection interface 34 enables the vehicle hardware 16 to send and receive signals with one another and with various systems both onboard and off-board the vehicle body 12. This allows the vehicle 10 to perform assorted vehicle functions, such as modulating powertrain output, activating friction and regenerative brake systems, controlling vehicle steering, regulating charge and discharge of a vehicle battery pack, and other automated functions. For instance, telematics unit 14 may exchange signals with a Powertrain Control Module (PCM) 52, an Advanced Driver Assistance System (ADAS) module 54, an Electronic Battery Control Module (EBCM) 56, a Steering Control Module (SCM) 58, a Brake System Control Module (BSCM) 60, and assorted other vehicle ECUs, such as a transmission control module (TCM), engine control module (ECM), Sensor System Interface Module (SSIM), etc.

With continuing reference to FIG. 1, telematics unit 14 is an onboard computing device that provides a mixture of services, both individually and through its communication with other networked devices. This telematics unit 14 is generally composed of one or more processors 40, each of which may be embodied as a discrete microprocessor, an application specific integrated circuit (ASIC), or a dedicated control module. Vehicle 10 may offer centralized vehicle control via a central processing unit (CPU) 36 that is operatively coupled to a real-time clock (RTC) 42 and one or more electronic memory devices 38, each of which may take on the form of a CD-ROM, magnetic disk, IC device, a solid-state drive (SSD) memory, a hard-disk drive (HDD) memory, flash memory, semiconductor memory (e.g., various types of RAM or ROM), etc.

Long-range communication (LRC) capabilities with off-board devices may be provided via one or more or all of a cellular chipset, an ultra-high frequency radio transceiver, a navigation and location component (e.g., global positioning system (GPS) transceiver), and/or a wireless modem, all of which are collectively represented at 44. Short-range communication (SRC) may be provided via a close-range communication device 46 (e.g., a BLUETOOTH® unit or near field communications (NFC) transceiver), a dedicated short-range communications (DSRC) component 48, and/or a dual antenna 50. The communications devices described above may provision data exchanges as part of a periodic broadcast in a vehicle-to-vehicle (V2V) communications network or a vehicle-to-everything (V2X) communications network, e.g., Vehicle-to-Infrastructure (V2I), Vehicle-to-Pedestrian (V2P), Vehicle-to-Device (V2D), etc. It is envisioned that the vehicle 10 may be implemented without one or more of the above listed components or, optionally, may include additional components and functionality as desired for a particular end use.

CPU 36 receives sensor data from one or more sensing devices that use, for example, photo detection, radar, laser, ultrasonic, optical, infrared, or other suitable technology, including short range communications technologies (e.g., DSRC) or Ultra-Wide Band (UWB) radio technologies, e.g., for executing an automated vehicle operation or a vehicle navigation service. In accord with the illustrated example, the automobile 10 may be equipped with one or more digital cameras 62, one or more range sensors 64, one or more vehicle speed sensors 66, one or more vehicle dynamics sensors 68, and any requisite filtering, classification, fusion, and analysis hardware and software for processing raw sensor data. The type, placement, number, and interoperability of the distributed array of in-vehicle sensors may be adapted, singly or collectively, to a given vehicle platform for achieving a desired level of automation and concomitant autonomous vehicle operation.

To propel the motor vehicle 10, an electrified powertrain is operable to generate and deliver tractive torque to one or more of the vehicle's drive wheels 26. The vehicle's electrified powertrain is generally represented in FIG. 1 by an electric traction motor 78 that is operatively connected to a rechargeable energy storage system (RESS), which may be in the nature of a chassis-mounted traction battery pack 70. The traction battery pack 70 is generally composed of one or more battery modules 72 each containing a group of electrochemical battery cells 74, such as lithium ion, lithium polymer, or nickel metal hydride battery cells. Traction motor/generator (M) unit 78 draws electrical power from and, optionally, delivers electrical power to the battery pack 70. A power inverter module (PIM) 80 electrically connects the battery pack 70 to the motor/generator unit(s) 78 and modulates the transfer of electrical current therebetween. The battery pack 70 may be configured such that module management, cell sensing, and module-to-module or module-to-host communications functionality is integrated directly into each module 72 and performed wirelessly via a wireless-enabled cell monitoring unit (CMU) 76.

Also shown in FIG. 1 is a mobile vehicle communications (MVC) system 82 that enables wireless communications with remotely located computing nodes for one or more travelling and stationary vehicles 10. MVC system 82 is represented herein by a constellation of GPS satellites 84, a wireless services satellite 86, an uplink transmitting station 88, a cellular (cell) transceiver tower 90, and a mobile switching center (MSC) 92. A host vehicle's GPS transceiver 44 may exchange radio signals (e.g., 1.58 GHZ (L1 signal) or 1.23 GHZ (L2 signal)) with the GPS satellites 84 to derive real-time or near real-time geopositional data and time information for the vehicle 10, which may be used to provide navigation and other related services to vehicle occupants. Wireless services satellite 86, through cooperative operation with the uplink transmitting station 88, provisions unidirectional and bidirectional communications with the vehicle 10, such as satellite radio and media services (e.g., music, news, videos, etc.) and satellite telephony services (e.g., utilized in addition to or in lieu of cellular phone services). While shown with a single vehicle 10 communicating with multiple GPS satellites 84, a single wireless services satellite 86, a single uplink station 88, a single cell tower 90, and a single MSC 92. MVC system 82 may incorporate any number and combination of the foregoing elements as well as other available and hereafter developed communications hardware.

The MVC system 82 may also operate within a cellular communications system 96, which is represented in FIG. 1 by one or more cell towers 90, one or more mobile switching centers 72, as well as any other networking components needed to connect the cellular communications system 96 with a land network (e.g., BO host service 24). Each cell tower 90 may be equipped with a respective set of sending and receiving antennas for exchanging radio signals (e.g., 1.8-2.1+GHz frequencies), as well as a dedicated base station. The base stations of different cell towers may be connected to the MSC 72 either directly or via intermediary equipment, such as a base station controller (not shown). The cellular communications system 96 may implement any suitable communications technology, including earlier cellular protocols, such as cellular digital packet data (CDPD) 2G technologies, or modern cellular protocols, such as 4G-LTE of 5G-Advanced technologies. Vehicle telematics unit 14 may function as a cellular-enabled mobile component that is registered with a cellular carrier to transmit network data packets to and from the cellular communications system 96. It should be appreciated that the system 96 may take on innumerable tower/station/MSC arrangements, including co-location of a base station and a cell tower at the same site, remotely locating base stations and cell towers from one another, a single base station servicing a single cell tower, a single cell servicing multiple cell towers, and coupling multiple base stations to a single MSC, to name but a few possible arrangements.

Figure 2A:
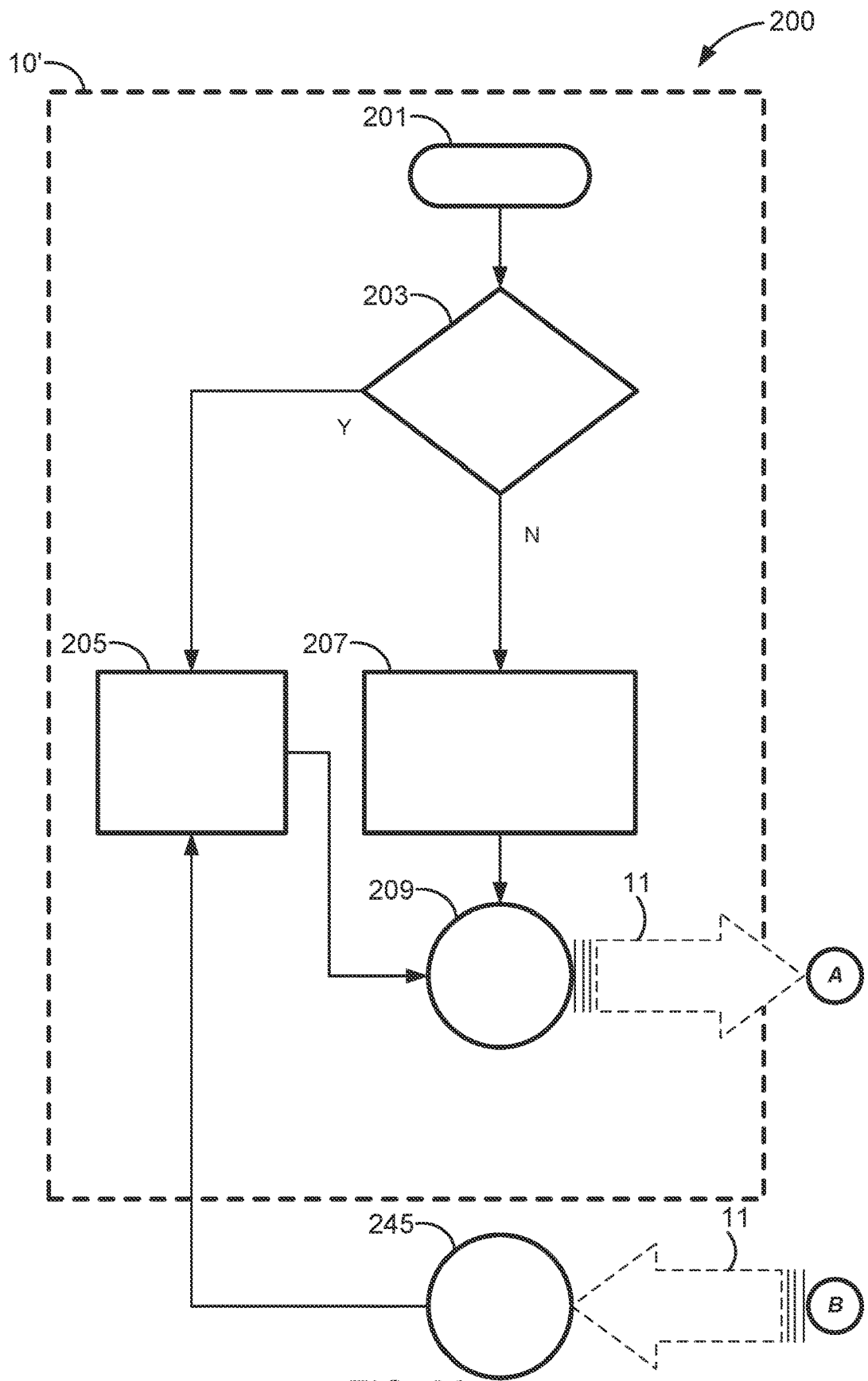
FIGS. 2A and 2B collectively present a flowchart illustrating a representative V2X communications algorithm for wireless mesh network message management for an incapacitated vehicle, which may correspond to memory-stored instructions that are executable by a resident or remote controller, control-logic circuit, programmable control unit, or other integrated circuit (IC) device or network of devices in accord with aspects of the disclosed concepts.
Figure 2B:
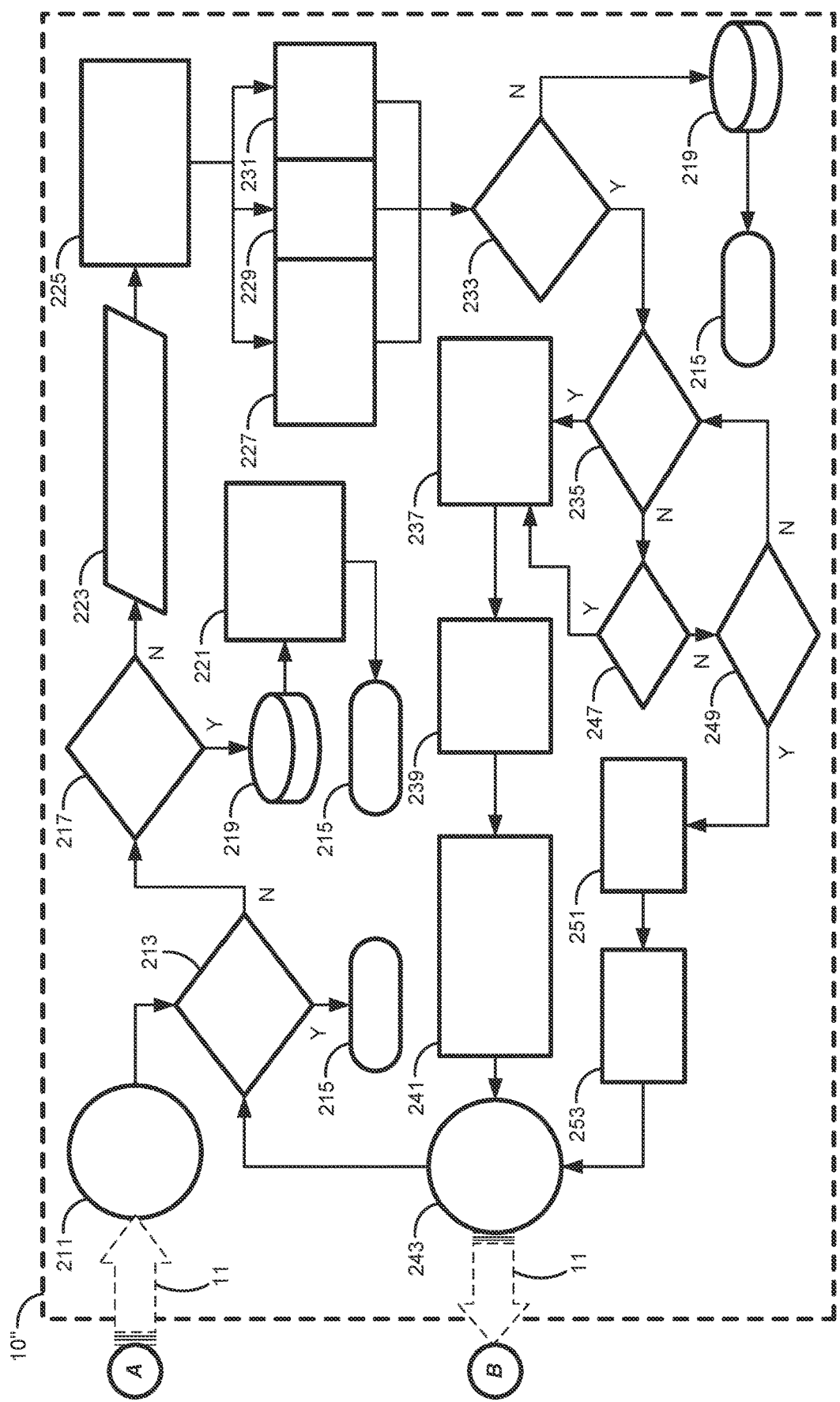

With reference next to the flow chart of FIGS. 2A and 2B, an improved method or control strategy for provisioning V2X wireless mesh network (WMN) communications for a motor vehicle, such as automobile 10 of FIG. 1, is generally described at 200 in accordance with aspects of the present disclosure. Some or all of the operations illustrated in FIGS. 2A and 2B and described in further detail below may be representative of an algorithm that corresponds to non-transitory, processor-executable instructions that are stored, for example, in main or auxiliary or remote memory (e.g., memory device 38 and/or database 98 of FIG. 1), and executed, for example, by an electronic controller, processing unit, dedicated control module, logic circuit, or other module or device or network of modules/devices (e.g., CPU 36 and/or cloud computing service 24 of FIG. 1), to perform any or all of the above and below described functions associated with the disclosed concepts. It should be recognized that the order of execution of the illustrated operation blocks may be changed, additional operation blocks may be added, and some of the herein described operations may be modified, combined, or eliminated. Moreover, the host vehicle 10' and the recipient vehicle 10"—while shown schematically in FIGS. 2A and 2B—may include any of the features and options discussed above with respect to the automobile 10 of FIG. 1, and vice versa.

Method 200 begins at START terminal block 201 of FIG. 2A with memory-stored, processor-executable instructions for a programmable controller or control module or similarly suitable processor to call up an initialization procedure for a distress message management protocol. This routine may be executed in real-time, near real-time, continuously, systematically, sporadically, and/or at regular intervals, for example, each 10 or 100 milliseconds during regular and routine operation of the motor vehicle 10. As yet another option, terminal block 201 may initialize responsive to a user command prompt (e.g., via telematics input controls 32), a resident vehicle controller prompt (e.g., via CPU 36), or a broadcast prompt signal received from an "off-board" centralized vehicle services system (e.g., BO cloud computing service 24). By way of non-limiting example, the method 200 may automatically initialize in response to a vehicle interface micro control unit (MCU) detecting a collision event, a powertrain fault, or other incapacitating event that renders disabled the host vehicle 10'. The MCU responsively transmits one or more "vehicle disabled" signals to the CPU 36 notifying the telematics unit 14 that the host vehicle 10' is incapacitated; the telematics unit 14 responsively initiates an "eCall" protocol. Upon completion of some or all of the control operations presented in FIGS. 2A and 2B, the method 200 may advance to END terminal block 215 and temporarily terminate or, optionally, may loop back to terminal block 201 and run in a continuous loop.

Advancing from terminal block 201 to HOST CONNECTIVITY decision block 203, the method 200 monitors available wireless connectivity to determine whether or not the disabled host vehicle 10' is able to directly contact a BO vehicle services system (e.g., ONSTAR®) or a first responder entity (e.g., paramedics, firefighters, law enforcement, etc.) via a cellular or satellite communications system (e.g., MVC system 82 of FIG. 1). During vehicle operation, the host vehicle 10' may be rendered disabled in an area with little or no cellular service (e.g., piggyback connection via occupant smartphone or direct connection via resident cell comm device unable to find signal from cellular carrier). When in such an "insufficient connectivity state," the telematics unit 14 is unable to wirelessly connect to the cellular communications system 96. At the same time, the host vehicle 10' may not be equipped or authorized to use satellite telephony services via wireless services satellite 86; as such, satellite communications are likewise unavailable. If no connection is initially achieved, decision block 203 may incorporate a "continuous call retry" protocol in which the vehicle comm system continually attempts to connect through cellular/satellite services, e.g., even as the method 200 traverses through the remaining process blocks in FIGS. 2A and 2B.

Responsive to being notified that the host vehicle 10' is disabled at Block 201, method 200 may actively monitor for and detect sufficient cellular/satellite connectivity such that the host vehicle's wireless comm device is able to communicatively connect to the BO service/first responder via cellular/satellite service. If a connection is achieved (Block 203=YES), the host vehicle 10' may execute STOPCALL data input/output block 205 and automate transmission of an eCall distress message to the BO service/first responder and contemporaneously set a "stop call" flag in cache memory that disables broadcast of the distress message over the WMN 11. For scenarios in which the host vehicle 10' had previously broadcast the distress message over the WMN 11 before achieving connectivity, block 205 may then broadcast a hop interrupt message over the WMN 11 to networked nodes to obviate recurrent retransmission of the distress message. At this juncture, method 200 may be temporarily suspended at terminal block 215.

If no connection is achieved by the disabled host vehicle 10' (Block 203=NO), the vehicle 10' may execute eCALL data input/output block 207 and broadcast a V2X eCall distress message over the WMN 11. In contrast to cellular and satellite communications networks, which employ a centralized national or global communications service to relay signals between end nodes (i.e., device-carrier-device architecture), a wireless mesh network is often an "ad hoc" construct with a local area network (LAN) topology in which WMN-enabled devices (nodes) connect directly and non-hierarchically to one another (i.e., device-to-device architecture). In a mesh network, every node-to-node transmission of a message across a link is referred to as a "hop". For V2V mesh networks, each connected vehicle may operate as a functional computing node within the mesh to efficiently route data to and from other nodes. The distress message may contain vehicle-specific data exclusive to the host vehicle (e.g., unique reference number, real-time vehicle geolocation data, vehicle-specific data (make/model/trim/color), owner/driver information, etc.) and incident-specific data unique to the incapacitating event that rendered the host disabled (e.g., event specifics, severity data, etc.). It may be desirable, for at least some implementations, that block 207 include processor-executable instructions for continually broadcasting the distress message over the WMN 11, e.g., until the host receives a hop interrupt message or a return message denoting the distress message was successfully transmitted to the BO system/first responder. At V2X WMN BROADCAST event block 209, the eCall distress message generated by the host vehicle 10' is disseminated over the WMN 11, e.g., to any WMN-connected V2X-enabled device within range of SRC.

With reference next to FIG. 2B, method 200 transitions across off-page connectors (A) from event block 209 to V2X MESSAGE RECEIPT event block 211 at which one or more in-range devices, such as a third-party recipient vehicle 10", receive the eCall distress message output by the host vehicle 10' over the WMN 11. After receiving the distress message, eCALL INTERRUPT DETECT decision block 213 includes processor-executable instructions that cause a resident controller of the recipient vehicle 10" to ascertain whether or not the recipient has received a hop interrupt message denoting that the subject distress message was transmitted via another node on the WMN to the BO vehicle services system or first responder. For instance, another WMN-connected recipient vehicle may have been able to successfully connect to the BO system via cellular or satellite service and notify them of the disabled host vehicle 10'. If a hop interrupt message was received by the recipient vehicle 10" (Block 213=YES), method 200 proceeds to terminal block 215 and suspends or terminates. In so doing, the resident controller disables the recipient vehicle 10" from retransmitting the distress message to other recipient nodes over the WMN 11.

Upon determining that a hop interrupt message was not received (Block 213=NO), method 200 responsively proceeds to ID CHECK decision block 217 with instructions for a resident controller of the recipient vehicle 10" to retrieve the unique vehicle-specific data embedded in the received distress message and, from this information, ascertain whether or not the recipient had previously received a prior distress message for the same incapacitating event of the same host vehicle. For instance, recipient vehicle 10" may cross-reference the unique reference number in the eCall distress message against cache memory-stored reference numbers of recently received distress messages to determine if the subject distress message or one corresponding thereto was already received. If a prior distress message for the disabled host vehicle 10' was already received by the recipient vehicle 10" (Block 217=YES), method 200 responsively sets a "stop call" flag in resident memory at STOP CALL data storage block 219 and concurrently classifies and stores the unique ID data of the host vehicle 10' in resident cache memory of the recipient vehicle 10" for future reference, as indicated at ID REFERENCE subroutine block 221. Method 200 then suspends or terminates at terminal block 215.

With continuing reference to FIG. 2B, method 200 automatically responds to a determination that a prior distress message for the disabled host vehicle 10' was not received (Block 217=NO) by executing HOP LIMITER CALIBRATION data block 223 to derive hop-limiting restrictions based on a designated severity level of the incapacitating event that disabled the host vehicle 10'. By way of example, and not limitation, the recipient vehicle's controller may access a resident memory device that stores a collection of hop limiter callup tables, each of which contains a calibrated set of multi-hop restrictions that corresponds to a respective severity level. From this collection, the resident controller selects the hop limiter callup table that corresponds to the severity level embedded within the distress message. As another option, data block 223 may include the recipient vehicle 10" retrieving a default set of hop restrictions and dynamically modulating one or more of the restrictions contained in the default set based on the event severity level embedded in the received distress message. Calibrated hop limiters may also be embedded within and retrieved from the received distress message. At this juncture, the retrieved/modulated set of calibrated multi-hop restrictions is stored in resident cache memory for later reference.

Method 200 advances from data block 223 to HOP VALUE RETRIEVAL data input block 225 and collects one or more message-specific hop values that is/are embedded within the received distress message. For instance, the distress message may contain a hop counter that tracks the number of times that distress message was transmitted from node to node on the WMN 11. In an example, a V2V MSN exchange from host 10' directly to recipient 10" has a hop count of 1, whereas a V2I2V exchange from host 10' to bridge to recipient 10" has a hop count of 2. This hop counter may be incremented prospectively by the host vehicle 10' or retrospectively by the recipient vehicle 10". As another option, the received distress message may contain a hop timer that tracks the lapsed time since the host vehicle 10' first broadcast of the distress message over the WMN 11. In an example, the host 10' becomes disabled and initially broadcasts at 1:25 pm EST, and the recipient 10" then receives the eCall distress message at 2:05 pm EST; the hop timer will read 40 mins at the time of receipt. As yet another option, the received distress message may contain a real-time geopositional location of the host vehicle 10' and, for some implementations, a virtual geofence associated with the host's geopositional location. It is also envisioned that the distress message may contain the real-time host geopositional location data and the recipient vehicle 10" uses this data to dynamically generate a virtual geofence based on resident memory-stored default geofence settings.

After corroborating the hop-limiting restrictions at block 223 and identifying the message-specific hop values at block 225, the method 200 compares each hop value with its respective hop restriction at HOP COMPARISON process blocks 227, 229 and 231. In particular, process block 227 includes comparing the hop count of the received distress message (e.g., Hop_count=4) against a maximum allowable hop count threshold (e.g., Hop_Cthresh=20). Likewise, process block 229 includes comparing the hop timer of the received distress message (e.g., Hop_time=40 mins) against a maximum allowable hop time threshold (e.g., Hop_Tthresh=1440 mins (24 hrs)). Process block 231, in comparison, includes comparing a real-time or near real-time geopositional location of the recipient vehicle 10" (e.g., Recip_loc=40.748, −73.984) against a geofence boundary of the virtual geofence (e.g., circular perimeter with 5-mile radius from real-time host vehicle location Host_loc=40.143, −73.920).

Transitioning from the hop comparisons of process blocks 227, 229, 231 to HOP RANGE decision block 233, the method 200 determines whether or not a message-specific hop value is within range of its corresponding hop restriction. For at least some implementations, if any one of the hop values is not within range of (e.g., exceeds) its respective restriction (e.g., Hop_count=23>Hop_Cthresh=20), decision block 233 returns a negative (NO) value; method 200 then responsively executes STOP CALL data storage block 219 (discussed above) and contemporaneously suspends or terminates at END terminal block 215. Conversely, if all of the hop values are within range of (e.g., less than) their respective hop restrictions, decision block 233 returns a positive (YES) value; method 200 then contacts the BO service/first responder or helps to perpetuate the eCall distress message across the WMN 11.

Upon determining that all hop values are within range (Block 233=YES), method 200 executes RECIPIENT CONNECTIVITY decision block 235 such that the recipient vehicle 10" monitors its available wireless connectivity to determine whether or not the recipient is able to directly contact a BO vehicle services system or a first responder entity, similar to decision block 203 described above. After detecting a "sufficient connectivity" status for the recipient vehicle 10" (Block 235=YES), the recipient's resident controller may responsively transmit the distress message to the BO system/first responder and concurrently execute RETURN MESSAGE subroutine block 237 to automate transmission of a return message over the WMN 11 to the host vehicle 10'. This return message notifies the host vehicle 10' and, if desired, any occupants thereof that the eCall distress message was successfully transmitted to the BO system/first responder and may present an optional note (e.g., "Help is on the way!").

Prior to, contemporaneous with, or after executing subroutine block 237, method 200 may optionally execute RETURN HOP INCREMENT process block 239 to increment the hop counter contained in the eCall distress message. After incrementing the hop counter, method 200 executes STOP CALL BROADCAST data output block 241 and broadcasts a hop interrupt message to one or more or all in-range nodes over the WMN 11. The hop interrupt message may contain the Unique ID data from the eCall distress message as well as a Stop Call flag denoting the distress message was successfully transmitted to the BO system/first responder. Method 200 may transition across off-page connectors (B) from V2X RECIPIENT BROADCAST event block 243, whereat the hop interrupt message and/or the return message is/are transmitted across WMN 11 to one or more in-range devices, to V2X HOST RECEIPT event block 245, whereat the return message is received by the host vehicle 10'.

Upon detecting an "insufficient connectivity" status for the recipient vehicle 10" (Block 235=NO), which denotes a failed attempt to contact the back office or first responder, the recipient's resident controller may responsively repeat its attempt to wirelessly connect to the BO/first responder by cell/sat comm services. RETRY decision block 247, for example, determines whether or not the recipient vehicle 10" has now acquired sufficient connectivity; if it has (Block 247=YES), method 200 loops to subroutine block 237 such that the recipient vehicle 10" outputs a return message to the host vehicle 10', as described above. If, after reattempting to achieve "sufficient connectivity" status, the retry attempt fails (Block 247=NO), method 200 determines whether or not the recipient vehicle 10" has exceeded its maximum allowable retry attempts at RETRY RANGE decision block 249; if not (Block 249=NO), the method 200 may loop back through blocks 235, 247, 249 and repeat attempts to acquire sat/cell wireless connectivity and contact the BO/first responder. It is also within the scope of this disclosure that the recipient vehicle 10" be given a single attempt to contact the BO/first responder (e.g., method 200 advancing from block 235 to block 251 and eliminating blocks 247 and 249) or a single retry to contact the BO/first responder (e.g., eliminating block 249 and converting block 247 to a process block). Upon determining that the recipient vehicle 10" has exceeded its maximum allowable retry attempts (Block 249=YES), the recipient vehicle's controller increments the hop counter embedded within the eCall distress message at NEW HOP INCREMENT process block 251 and then broadcasts an updated V2X WMN distress message at PERPETUATE MESSAGE data output block 253.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software, or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, a solid-state drive (SSD) memory, a hard-disk drive (HDD) memory, a CD-ROM, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms may be described with reference to flowcharts and/or workflow diagrams depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method of controlling operation of a host vehicle with a vehicle controller and a wireless communications (comm) device, the method comprising:
   receiving, via the vehicle controller, a vehicle disabled signal indicating the host vehicle is incapacitated due to an incapacitating vehicle event;
   detecting, via the vehicle controller responsive to receiving the vehicle disabled signal, an insufficient connectivity state indicating the wireless comm device is unable to wirelessly connect to a cellular or satellite communications system;
   broadcasting, over a wireless mesh network (WMN) via the vehicle controller responsive to detecting the insufficient connectivity state, a distress message containing vehicle data specific to the host vehicle and incident data specific to the incapacitating vehicle event;
   determining, via a resident controller of a recipient vehicle using the vehicle data, if a prior distress message for the incapacitating vehicle event was previously received;
   determining, via the resident controller of the recipient vehicle using the incident data, if the distress message exceeds a preset multi-hop restriction;
   transmitting, via the resident controller responsive to the prior distress message being previously received and/or the distress message exceeding the preset multi-hop restriction, a disable command signal to a resident subsystem of the recipient vehicle disabling retransmission of the distress message to another recipient node over the WMN;
   detecting, via the resident controller responsive to the prior distress message not being previously received and the distress message not exceeding the preset multi-hop restriction, a sufficient connectivity status indicating the recipient vehicle is able to contact a back-office (BO) vehicle services system or a first responder entity; and
   transmitting, via the resident controller responsive to detecting the sufficient connectivity status: (1) the distress message to the BO vehicle services system or the first responder entity; (2) a return message to the host vehicle indicating the distress message was sent to the BO vehicle services system or the first responder entity; and/or (3) a hop interrupt message to one or more additional nodes over the WMN indicating the distress message was sent to the BO vehicle services system or the first responder entity.

2. The method of claim 1, wherein the distress message contains a hop counter tracking a number of times the distress message was transmitted from node to node on the WMN, the preset multi-hop restriction includes a hop count threshold, and the distress message exceeds the preset multi-hop restriction when the hop counter exceeds the hop count threshold.

3. The method of claim 1, wherein the distress message contains a hop timer tracking a time since first broadcast of the distress message by the host vehicle over the WMN, the preset multi-hop restriction includes a hop time threshold, and the distress message exceeds the preset multi-hop restriction when the hop timer exceeds the hop time threshold.

4. The method of claim 1, wherein the distress message contains a real-time host vehicle location of the host vehicle, the preset multi-hop restriction includes a geofence boundary relative to the real-time host vehicle location, and the distress message exceeds the preset multi-hop restriction when a real-time recipient vehicle location of the recipient vehicle is outside the geofence boundary.

5. The method of claim 1, further comprising:
   receiving, via the resident controller after receiving the distress message, a hop interrupt message indicating the distress message was successfully transmitted via another node on the WMN to the BO vehicle services system or the first responder entity; and
   transmitting, via the resident controller responsive to receiving the hop interrupt message, the disable command signal to the resident subsystem of the recipient vehicle disabling retransmission of the distress message to another node over the WMN.

6. The method of claim 1, further comprising:
   detecting, via the vehicle controller responsive to receiving the vehicle disabled signal, a sufficient connectivity state indicating the wireless comm device is able to wirelessly connect to the cellular or satellite communications system; and
   transmitting, via the vehicle controller responsive to detecting the sufficient connectivity state, a host disable command signal to a resident host subsystem of the host vehicle disabling transmission of the distress message over the WMN.

7. The method of claim 1, further comprising:
   retrieving, via the resident controller from a memory device storing a plurality of multi-hop restrictions responsive to receiving the distress message, a set of multi-hop restrictions calibrated to a severity level of the incapacitating vehicle event; and
   setting, prior to the resident controller determining if the distress message exceeds the preset multi-hop restriction, the preset multi-hop restriction to the set of multi-hop restrictions.

8. The method of claim 1, further comprising retransmitting, via the resident controller of the recipient vehicle responsive to the prior distress message not being previously received and the distress message not exceeding the preset multi-hop restriction, the distress message to one or more additional nodes over the WMN.

9. The method of claim 8, further comprising:
  detecting, via the resident controller, an insufficient connectivity status indicating the recipient vehicle is not able to contact the BO vehicle services system or the first responder entity,
  wherein retransmitting the distress message to the one or more additional nodes over the WMN is further responsive to detecting the insufficient connectivity status.

10. The method of claim 9, further comprising:
  determining, via the resident controller responsive to detecting the insufficient connectivity status, a failed retry connection event indicating the recipient vehicle did not successfully contact the BO vehicle services system or the first responder entity; and
  determining, via the resident controller responsive to the failed retry connection event, if a retry connection counter tracking a number of retry connection attempts exceeds a retry count threshold,
  wherein retransmitting the distress message to the one or more additional nodes over the WMN is further responsive to the retry connection counter exceeding the retry count threshold.

11. The method of claim 10, further comprising incrementing a hop counter contained in the distress message prior to retransmitting the distress message over the WMN.

12. The method of claim 1, wherein the vehicle disabled signal is received from a vehicle interface micro control unit (MCU) resident to the host vehicle or an occupant of the host vehicle via an in-vehicle human machine interface (HMI).

13. Non-transitory, computer-readable media storing instructions executable by a vehicle controller of a host vehicle having a wireless communications (comm) device and/or a resident controller of a recipient vehicle having a resident wireless comm device configured to communicate with the host vehicle over a wireless mesh network (WMN), the instructions, when executed, causing the vehicle controller and/or the resident controller to perform operations comprising:
  receiving, via the vehicle controller, a vehicle disabled signal indicating the host vehicle is incapacitated due to an incapacitating vehicle event;
  detecting, via the vehicle controller responsive to receiving the vehicle disabled signal, an insufficient connectivity state indicating the wireless comm device is unable to wirelessly connect to a cellular or satellite communications system;
  broadcasting, via the vehicle controller over the WMN responsive to detecting the insufficient connectivity state, a distress message containing vehicle data specific to the host vehicle and incident data specific to the incapacitating vehicle event;
  receiving, via the resident controller using the resident wireless comm device, the distress message over the WMN;
  determining, via the resident controller using the vehicle data, if a prior distress message for the incapacitating vehicle event was previously received;
  determining, via the resident controller using the incident data, if the distress message exceeds a preset multi-hop restriction;
  transmitting, via the resident controller responsive to the prior distress message being previously received and/or the distress message exceeding the preset multi-hop restriction, a disable command signal to a resident subsystem of the recipient vehicle disabling retransmission of the distress message to another recipient node over the WMN;
  detecting, via the resident controller responsive to the prior distress message not being previously received and the distress message not exceeding the preset multi-hop restriction, a sufficient connectivity status indicating the recipient vehicle is able to contact a back-office (BO) vehicle services system or a first responder entity; and
  transmitting, via the resident controller responsive to detecting the sufficient connectivity status: (1) the distress message to the BO vehicle services system or the first responder entity; (2) a return message to the host vehicle indicating the distress message was sent to the BO vehicle services system or the first responder entity; and/or (3) a hop interrupt message to one or more additional nodes over the WMN indicating the distress message was sent to the BO vehicle services system or the first responder entity.

14. A vehicle network, comprising:
  a host vehicle with a vehicle controller and a wireless communications (comm) device, the vehicle controller being programmed to:
    receive a vehicle disabled signal indicating the host vehicle is incapacitated due to an incapacitating vehicle event;
    responsive to receiving the vehicle disabled signal, detect an insufficient connectivity state indicating the wireless comm device is unable to wirelessly connect to a cellular or satellite communications system; and
    responsive to detecting the insufficient connectivity state, broadcast over a wireless mesh network (WMN) a distress message containing vehicle data specific to the host vehicle and incident data specific to the incapacitating vehicle event; and
  a recipient vehicle with a resident controller and a resident wireless comm device configured to connect to the WMN, the resident controller being programmed to:
    receive the distress message via the resident wireless comm device;
    using the vehicle data, determine if a prior distress message for the incapacitating vehicle event was previously received;
    using the incident data, determine if the distress message exceeds a preset multi-hop restriction;
    responsive to the prior distress message being previously received and/or the distress message exceeding the preset multi-hop restriction, transmit a disable command signal to a resident subsystem of the recipient vehicle disabling retransmission of the distress message to another recipient node over the WMN;
    responsive to the prior distress message not being previously received and the distress message not exceeding the preset multi-hop restriction, detect a sufficient connectivity status indicating the recipient vehicle is able to contact a back-office (BO) vehicle services system or a first responder entity; and
    responsive to detecting the sufficient connectivity status, transmit: the distress message to the BO vehicle services system or the first responder entity; a return message to the host vehicle indicating the distress message was sent to the BO vehicle services system or the first responder entity; and/or a hop interrupt message to one or more additional nodes over the WMN indicating the distress message was sent to the BO vehicle services system or the first responder entity.

15. The vehicle network of claim 14, wherein the distress message contains a hop counter tracking a number of times the distress message was transmitted node to node on the WMN, the preset multi-hop restriction includes a hop count threshold, and the distress message exceeds the preset multi-hop restriction when the hop counter exceeds the hop count threshold.

16. The vehicle network of claim 14, wherein the distress message contains a hop timer tracking a time since first broadcast of the distress message by the host vehicle over the WMN, the preset multi-hop restriction includes a hop time threshold, and the distress message exceeds the preset multi-hop restriction when the hop timer exceeds the hop time threshold.

17. The vehicle network of claim 14, wherein the distress message contains a real-time host vehicle location of the host vehicle, the preset multi-hop restriction includes a geofence boundary relative to the real-time host vehicle location, and the distress message exceeds the preset multi-hop restriction when a real-time recipient vehicle location of the recipient vehicle is outside the geofence boundary.

18. The vehicle network of claim 14, wherein the resident controller is further programmed to:

after receiving the distress message, receive a hop interrupt message indicating the distress message was successfully transmitted via another node on the WMN to the BO vehicle services system or the first responder entity; and responsive to receiving the hop interrupt message, transmit the disable command signal to the resident subsystem of the recipient vehicle disabling retransmission of the distress message to another node over the WMN.

19. The vehicle network of claim 14, wherein the resident controller is further programmed to:

retrieve, from a memory device storing a plurality of multi-hop restrictions responsive to receiving the distress message, a set of multi-hop restrictions calibrated to a severity level of the incapacitating vehicle event; and set, prior to the resident controller determining if the distress message exceeds the preset multi-hop restriction, the preset multi-hop restriction to the set of multi-hop restrictions.

20. The vehicle network of claim 14, wherein the vehicle controller is further programmed to:

responsive to receiving the vehicle disabled signal, detect a sufficient connectivity state indicating the wireless comm device is able to wirelessly connect to the cellular or satellite communications system; and responsive to detecting the sufficient connectivity state, transmit a host disable command signal to a resident host subsystem of the host vehicle disabling transmission of the distress message over the WMN.

* * * * *